(12) United States Patent
Genet, Sr.

(10) Patent No.: US 8,575,500 B1
(45) Date of Patent: Nov. 5, 2013

(54) HAND-HELD ELECTRONIC LUGGAGE SCALE DEVICE

(76) Inventor: Edward J. Genet, Sr., Doylestown, OH (US)

( * ) Notice: Subject to any disclaimer, the term of this patent is extended or adjusted under 35 U.S.C. 154(b) by 444 days.

(21) Appl. No.: 12/949,021

(22) Filed: Nov. 18, 2010

(51) Int. Cl.
*A45C 13/28* (2006.01)
*G01G 19/58* (2006.01)

(52) U.S. Cl.
USPC ............................ 177/148; 177/245; 190/116

(58) Field of Classification Search
USPC ................... 177/131, 148, 149, 245; 190/116
See application file for complete search history.

(56) References Cited

U.S. PATENT DOCUMENTS

| | | | | |
|---|---|---|---|---|
| 45,873 | A * | 1/1865 | Steele | 177/149 |
| 179,842 | A * | 7/1876 | Deland | 177/131 |
| 812,830 | A * | 2/1906 | Dahlman | 177/149 |
| 1,059,083 | A * | 4/1913 | Smallwood | 294/118 |
| 1,105,618 | A * | 8/1914 | Christianson | 177/149 |
| 1,221,673 | A * | 4/1917 | Canty | 177/149 |
| 1,497,380 | A * | 6/1924 | Prawalski | 177/149 |
| 2,518,973 | A * | 8/1950 | Atherton | 190/102 |
| 2,710,083 | A * | 6/1955 | White | 190/102 |
| 2,759,577 | A | 8/1956 | White | |
| 2,937,016 | A * | 5/1960 | Westman | 177/156 |
| 3,090,454 | A | 5/1963 | Farrar et al. | |
| D248,011 | S | 5/1978 | Szabo | |
| 5,031,710 | A * | 7/1991 | Parker et al. | 177/210 FP |
| 5,033,563 | A * | 7/1991 | Brainerd et al. | 177/132 |
| 7,156,918 | B2 * | 1/2007 | Marks | 177/168 |
| 7,281,615 | B2 | 10/2007 | Siwak et al. | |
| 7,378,604 | B2 | 5/2008 | Truong | |
| D592,983 | S | 5/2009 | Schantz | |
| 8,485,329 | B1 * | 7/2013 | Roy et al. | 190/116 |
| 2006/0207850 | A1 | 9/2006 | Lewis | |
| 2007/0007048 | A1 | 1/2007 | Gill | |
| 2007/0045011 | A1 * | 3/2007 | Dittrich et al. | 177/148 |
| 2007/0163813 | A1 * | 7/2007 | Lewis | 177/148 |
| 2010/0181354 | A1 * | 7/2010 | Laniado | 224/259 |
| 2011/0186357 | A1 * | 8/2011 | Sheikh | 177/148 |
| 2012/0222904 | A1 * | 9/2012 | Lu | 177/148 |
| 2013/0140097 | A1 * | 6/2013 | Zyman Beer et al. | 177/148 |

FOREIGN PATENT DOCUMENTS

| | | | | | |
|---|---|---|---|---|---|
| GB | | 2385142 A * | 8/2003 | | G01G 19/58 |
| GB | | 2443844 A * | 5/2008 | | G01G 19/14 |
| WO | WO 2009/111993 A1 * | | 9/2009 | | G01G 19/58 |

* cited by examiner

*Primary Examiner* — Randy W Gibson

(57) ABSTRACT

A luggage scale device featuring a handle with scale housings attached to both ends. Hook component are disposed on the ends of each housing for attaching a piece of luggage. In each housing is a high tension spring attached to a weight sensor and a hook component. The weight sensors calculate a weight of an object hanging from the hook components. A microprocessor calculates a total weight by combining the values calculated by the weight sensors. A display disposed on the handle displays the total weight.

6 Claims, 2 Drawing Sheets

HAND-HELD ELECTRONIC LUGGAGE SCALE DEVICE

FIELD OF THE INVENTION

The present invention is directed to a scale, more particularly to a hand-held scale for weighing luggage.

BACKGROUND OF THE INVENTION

Many people find themselves at airline ticket counters with luggage that is too heavy, and it can be expensive to pay for overweight luggage. The present invention features a luggage scale device that can be used to weigh luggage before going to the airport. As shown in FIG. 5, the luggage scale device is a hand-held device can be attached to a strap of a piece of luggage.

Any feature or combination of features described herein are included within the scope of the present invention provided that the features included in any such combination are not mutually inconsistent as will be apparent from the context, this specification, and the knowledge of one of ordinary skill in the art. Additional advantages and aspects of the present invention are apparent in the following detailed description and claims.

SUMMARY

The present invention features a luggage scale device comprising a handle 110 having a first end 110a, a second end 110b, a top surface 110c, and a bottom surface 110d; a first scale housing 120a pivotally attached to the first end 110a of the handle 110 via a first hinge component 118a, wherein a first weight sensor 150a is disposed in the first scale housing 120a, the first weight sensor 150a is adapted to calculate a weight of an object; a second scale housing 120b pivotally attached to the second end 110b of the handle 110 via a second hinge component 118b, wherein a second weight sensor 150b is disposed in the second scale housing 120b, the second weight sensor 150b is adapted to calculate a weight of an object; a first hook component 130a disposed on an end of the first scale component 120a and a second hook component 130b disposed on an end of the second scale component 120b, the hook components 130 each allow for attachment of an object; a first high tension spring 140a disposed in the first scale housing 120a, a first end of the first high tension spring 140a being attached to the first hook component 130a and a second end of the first high tension spring 140a being attached to the first weight sensor 150a, the first weight sensor 150a is adapted to calculate a weight of an object hanging from the first hook component 130a; a second high tension spring 140b disposed in the second scale housing 120b, a first end of the second high tension spring 140b is attached to the second hook component 130b and a second end of the second high tension spring 140b is attached to the second weight sensor 150b, the second weight sensor 150b is adapted to calculate a weight of an object hanging from the second hook component 130b; a microprocessor operatively connected to both the first weight sensor and the second weight sensor 150b, the microprocessor is adapted to generate a first output command to the first weight sensor 150a to recall the weight of the object hanging from the first hook component 130a calculated by the first weight sensor 150a and a second output command to the second weight sensor 150b to recall the weight of the object hanging from the second hook component 130b calculated by the second weight sensor 150b whereupon the microprocessor calculates a total weight by combining the weight of the object hanging from the first hook component 130a and the weight of the object hanging from the second hook component 130b; and a display 160 disposed on the handle 110, the display 160 is operatively connected to the microprocessor, the microprocessor is adapted to generate an output command to the display 160 to cause the display 160 to display the total weight calculated by the microprocessor.

DESCRIPTION OF PREFERRED EMBODIMENTS

Figure 1:
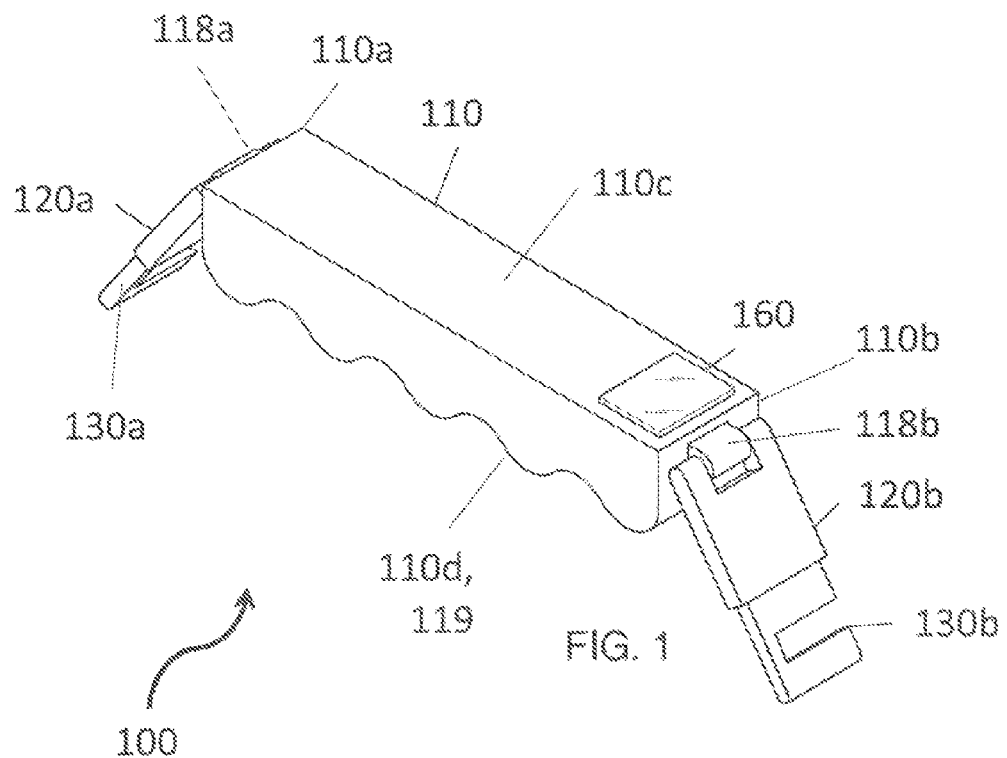
FIG. 1 is a perspective view of the luggage scale device of the present invention.
Figure 2:
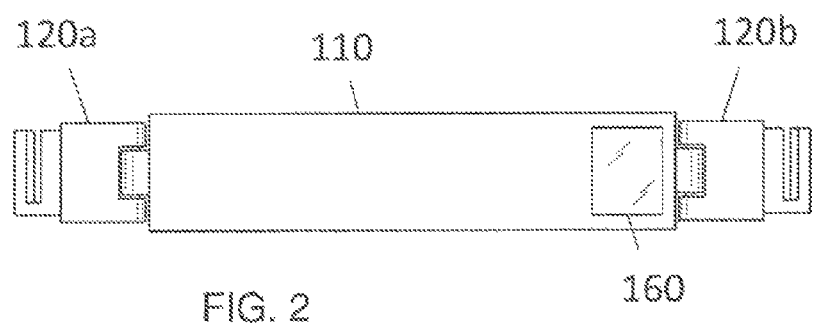
FIG. 2 is a top view of the luggage scale device of the present invention.
Figure 3:
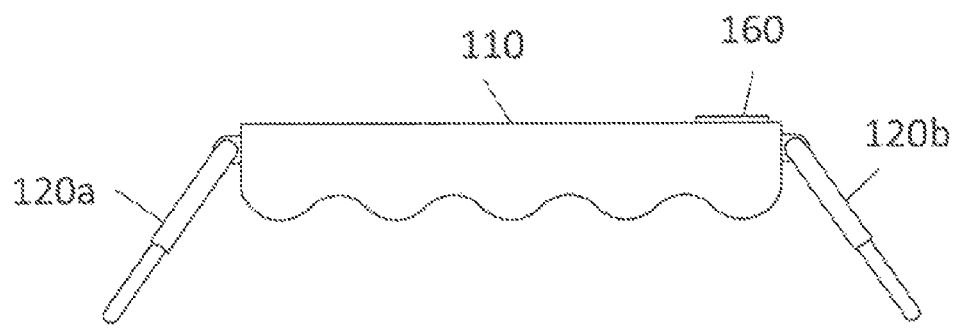
FIG. 3 is a side view of the luggage scale device of the present invention.
Figure 4:
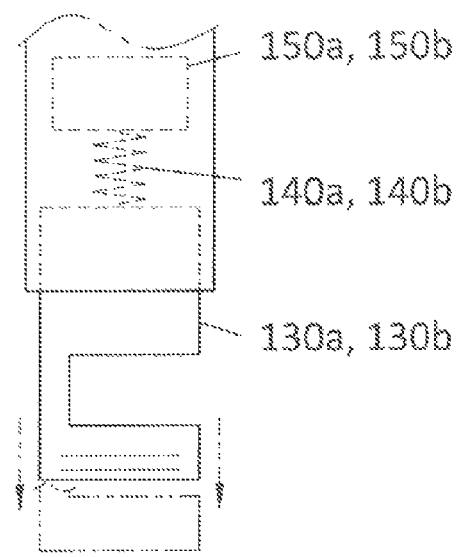
FIG. 4 is a detailed view of the luggage scale device of the present invention.
Figure 5:
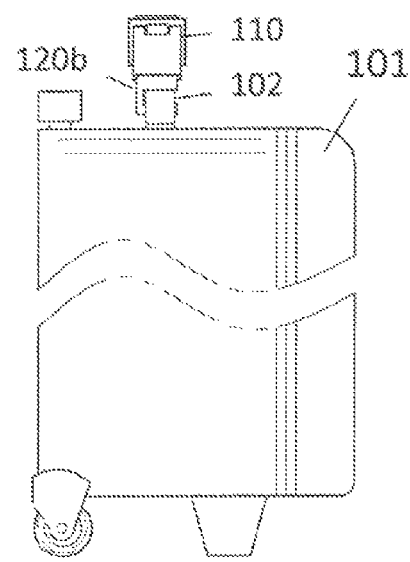
FIG. 5 is an in-use view of the luggage scale device of the present invention.

Referring now to FIG. 1-5, the present invention features a luggage scale device 100 for weighing luggage. The luggage scale device 100 comprises a handle 110 having a first end 110a, a second end 110b, a top surface 110c, and a bottom surface 110d. In some embodiments, one or more grooves 119 are disposed on the handle 110, for example along the bottom surface, top surface, and/or side surfaces. The grooves 119 can help provide a comfortable grip on the handle 110.

A first scale housing 120a is pivotally attached to the first end of the handle 110 (e.g., via a first hinge component 118a). A second scale housing 120b is pivotally attached to the second end of the handle 110 (e.g., via a second hinge component 118b). A first hook component 130a is disposed on the end of the first scale component 120a and a second hook component 130b is disposed on the end of the second scale component 120b. The hook components 130 allow the device 100 to be hooked onto a strap 102 of a piece of luggage 101.

Disposed in the first scale housing 120a is a first high tension spring 140a. The first spring 140a has a first end and a second end. The first end is attached to the first hook component 130a. The second end is attached to a first weight sensor (the first weight sensor 150a is disposed in the first scale housing 120a). The first weight sensor is adapted to calculate a weight of an object hanging from the first hook component 130a.

Disposed in the second scale housing 120b is a second high tension spring 140b. The second spring 140b has a first end and a second end. The first end is attached to the second hook component 130b. The second end is attached to a second weight sensor 150b (the second weight sensor 150b is disposed in the second scale housing 120b). The second weight sensor 150b is adapted to calculate a weight of an object hanging from the second hook component 130b.

The device of the present invention further comprises a microprocessor operatively connected to both the first weight sensor and the second weight sensor 150b. The microprocessor is adapted to calculate the weight of a piece of luggage hanging from both the first hook component 130a and the second hook component 130b.

A display 160 (e.g., a liquid crystal display (LCD)) is disposed on the handle 110, for example on the top surface of the handle 110. The display 160 is operatively connected to the microprocessor. The microprocessor is adapted to generate output commands to the display to cause the display 160 to display the weight of the piece of luggage 101.

The device 100 of the present invention may be constructed in a variety of sizes. For example, in some embodiments, the handle 110 is between about 4 to 6 inches in length as measured from the first end to the second end. In some embodiments, the handle 110 is between about 6 to 8 inches in length as measured from the first end to the second end. The device 100 of the present invention is not limited to the aforementioned sizes.

As used herein, the term "about" refers to plus or minus 10% of the referenced number. For example, an embodiment wherein the handle 110 is about 6 inches in length includes a handle 110 that is between 5.4 and 6.6 inches in length.

The disclosures of the following U.S. Patents are incorporated in their entirety by reference herein: U.S. Pat. No. 7,281,615; U.S. Pat. No. 3,090,454; U.S. Pat. No. 2,759,577; U.S. Pat. No. 7,378,604; U.S. Pat. Application No. 2007/0007048; U.S. Pat. Application No. 2006/0207850; U.S. Design Pat. No. D248,011; U.S. Design Pat. No. D592,983.

Various modifications of the invention, in addition to those described herein, will be apparent to those skilled in the art from the foregoing description. Such modifications are also intended to fall within the scope of the appended claims. Each reference cited in the present application is incorporated herein by reference in its entirety.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims.

The reference numbers recited in the below claims are solely for ease of examination of this patent application, and are exemplary, and are not intended in any way to limit the scope of the claims to the particular features having the corresponding reference numbers in the drawings.

What is claimed is:

1. A luggage scale device comprising:
   (a) a handle 110 having a first end 110*a*, a second end 110*b*, a top surface 110*c*, and a bottom surface 110*d*;
   (b) a first scale housing 120*a* pivotally attached to the first end 110*a* of the handle 110 via a first hinge component 118*a*, wherein a first weight sensor 150*a* is disposed in the first scale housing 120*a*, the first weight sensor 150*a* is adapted to calculate a weight of an object;
   (c) a second scale housing 120*b* pivotally attached to the second end 110*b* of the handle 110 via a second hinge component 118*b*, wherein a second weight sensor 150*b* is disposed in the second scale housing 120*b*, the second weight sensor 150*b* is adapted to calculate a weight of an object;
   (d) a first hook component 130*a* disposed on an end of a first scale component 120*a* and a second hook component 130*b* disposed on an end of a second scale component 120*b*, the hook components 130 each allow for attachment of an object;
   (e) a first high tension spring 140*a* disposed in the first scale housing 120*a*, a first end of the first high tension spring 140*a* being attached to the first hook component 130*a* and a second end of the first high tension spring 140*a* being attached to the first weight sensor 150*a*, the first weight sensor 150*a* is adapted to calculate a weight of an object hanging from the first hook component 130*a*;
   (f) a second high tension spring 140*b* disposed in the second scale housing 120*b*, a first end of the second high tension spring 140*b* is attached to the second hook component 130*b* and a second end of the second high tension spring 140*b* is attached to the second weight sensor 150*b*, the second weight sensor 150*b* is adapted to calculate a weight of an object hanging from the second hook component 130*b*;
   (g) a microprocessor operatively connected to both the first weight sensor and the second weight sensor 150*b*, the microprocessor is adapted to generate a first output command to the first weight sensor 150*a* to recall the weight of the object hanging from the first hook component 130*a* calculated by the first weight sensor 150*a* and a second output command to the second weight sensor 150*b* to recall the weight of the object hanging from the second hook component 130*b* calculated by the second weight sensor 150*b* whereupon the microprocessor calculates a total weight by combining the weight of the object hanging from the first hook component 130*a* and the weight of the object hanging from the second hook component 130*b*; and
   (h) a display 160 disposed on the handle 110, the display 160 is operatively connected to the microprocessor, the microprocessor is adapted to generate an output command to the display 160 to cause the display 160 to display the total weight calculated by the microprocessor;
   wherein the arrangement is such that the first hook component 130*a* is attached to the first end of the first high tension spring 140*a*, the second end of the first high tension spring 140*a* is attached to the first weight sensor 150*a*, the first weight sensor 150*a* is disposed inside the first scale housing 120*a*, and the first scale housing 120*a* is attached to the first end of the handle 110 via the first hinge component 118*a*;
   wherein the arrangement is such that the second hook component 130*b* is attached to the first end of the second high tension spring 140*b*, the second end of the second high tension spring 140*b* is attached to the second weight sensor 150*b*, the second weight sensor 150*b* is disposed inside the second scale housing 120*b*, and the second scale housing 120*b* is attached to the second end of the handle 110 via the second hinge component 118*b*;
   wherein the first scale housing 120*a* and second scale housing 120*b* pivot toward and away from each other.

2. The device of claim 1 further comprising grooves 119 disposed on the handle 110 for helping to provide a comfortable grip on the handle 110.

3. The device of claim 1, wherein the handle 110 is between about 4 to 6 inches in length as measured from the first end 110*a* to the second end 110*b*.

4. The device of claim 1, wherein the handle 110 is between about 6 to 8 inches in length as measured from first end 110*a* to the second end 110*b*.

5. The device of claim 1, wherein the display 160 is a liquid crystal display.

6. A luggage scale device consisting of:
   (a) a handle 110 consisting of a first end 110*a*, a second end 110*b*, a top surface 110*c*, and a bottom surface 110*d*;
   (b) a first scale housing 120*a* pivotally attached to the first end 110*a* of the handle 110 via, a first hinge component 118*a*, wherein a first weight sensor 150*a* is disposed in the first scale housing 120*a*, the first weight sensor 150*a* is adapted to calculate a weight of an object;
   (c) a second scale housing 120*b* pivotally attached to the second end 110*b* of the handle 110 via a second hinge component 118*b*, wherein a second weight sensor 150*b* is disposed in the second scale housing 120b, the second weight sensor 150b is adapted to calculate a weight of an object;

(d) a first hook component 130a disposed on an end of a first scale component 120a and a second hook component 130b disposed on an end of a second scale component 120b, the hook components 130 each allow for attachment of an object;

(e) a first high tension spring 140a disposed in the first scale housing 120a, a first end of the first high tension spring 140a being attached to the first hook component 130a and a second end of the first high tension spring 140a being attached to the first weight sensor 150a, the first weight sensor 150a is adapted to calculate a weight of an object hanging from the first hook component 130a;

(f) a second high tension spring 140b disposed in the second scale housing 120b, a first end of the second high tension spring 140b is attached to the second hook component 130b and a second end of the second high tension spring 140b is attached to the second weight sensor 150b, the second weight sensor 150b is adapted to calculate a weight of an object hanging from the second hook component 130b;

(g) a microprocessor operatively connected to both the first weight sensor and the second weight sensor 150b, the microprocessor is adapted to generate a first output command to the first weight sensor 150a to recall the weight of the object hanging from the first hook component 130a calculated by the first weight sensor 150a and a second output command to the second weight sensor 150b to recall the weight of the object hanging from the second hook component 130b calculated by the second weight sensor 150b whereupon the microprocessor calculates a total weight by combining the weight of the object hanging from the first hook component 130a and the weight of the object hanging from the second hook component 130b; and (h) a display 160 disposed on the handle 110, the display 160 is operatively connected to the microprocessor, the microprocessor is adapted to generate an output command to the display 160 to cause the display 160 to display the total weight calculated by the microprocessor;

wherein the arrangement is such that the first hook component 130a is attached to the first end of the first high tension spring 140a, the second end of the first high tension spring 140a is attached to the first weight sensor 150a, the first weight sensor 150a is disposed inside the first scale housing 120a, and the first scale housing 120a is attached to the first end of the handle 110 via the first hinge component 118a;

wherein the arrangement is such that the second hook component 130b is attached to the first end of the second high tension spring 140b, the second end of the second high tension spring 140b is attached to the second weight sensor 150b, the second weight sensor 150b is disposed inside the second scale housing 120b, and the second scale housing 120b is attached to the second end of the handle 110 via the second hinge component 118b;

wherein the first scale housing 120a and second scale housing 120b pivot toward and away from each other.

* * * * *